(12) United States Patent
Huang

(10) Patent No.: US 9,920,814 B2
(45) Date of Patent: Mar. 20, 2018

(54) CLEVIS STRUCTURE

(71) Applicant: Vincent Huang, Miaoli County (TW)

(72) Inventor: Vincent Huang, Miaoli County (TW)

( * ) Notice: Subject to any disclaimer, the term of this patent is extended or adjusted under 35 U.S.C. 154(b) by 0 days.

(21) Appl. No.: 15/236,601

(22) Filed: Aug. 15, 2016

(65) Prior Publication Data

US 2018/0045274 A1  Feb. 15, 2018

(51) Int. Cl.
| | |
|---|---|
| *F16G 11/00* | (2006.01) |
| *F16G 11/10* | (2006.01) |
| *F16G 11/14* | (2006.01) |

(52) U.S. Cl.
CPC .............. *F16G 11/10* (2013.01); *F16G 11/14* (2013.01); *Y10T 24/1379* (2015.01)

(58) Field of Classification Search
CPC ............ Y10T 24/4764; Y10T 24/4755; Y10T 24/1379; Y10T 24/312; Y10T 24/4005; Y10T 24/31; F16G 11/10
USPC ....... 248/222.41; 294/82.11, 82.17; 403/157, 403/79
See application file for complete search history.

(56) References Cited

U.S. PATENT DOCUMENTS

| | | | | |
|---|---|---|---|---|
| 2,406,607 A | * | 8/1946 | Jensen | F16G 11/10 24/481 |
| 2,470,878 A | * | 5/1949 | Tate | A22B 7/002 248/215 |
| 3,889,502 A | * | 6/1975 | Kruger | A45C 11/323 24/3.6 |
| 3,929,266 A | * | 12/1975 | Kim | A45F 5/02 224/255 |
| 5,495,734 A | * | 3/1996 | Yu | A44B 15/00 24/3.6 |

* cited by examiner

*Primary Examiner* — Robert Sandy
*Assistant Examiner* — Michael S Lee
(74) *Attorney, Agent, or Firm* — Rosenberg, Klein & Lee

(57) ABSTRACT

A clevis structure includes a main body, a bridge member and a load member. The bridge member has a base section and at least one arm section pivotally connected with the main body, whereby the bridge member and the main body can freely swing relative to each other. The base section is formed with a guide slot extending to the arm section. The arm section is further formed with a through hole in a position where the arm section is pivotally connected with the main body. The through hole has a diameter larger than a width of the guide slot. The load member has two ends, one of which is enlarged to form a pivotal hanging head section and the other of which is formed as a connection ring. A neck section is formed between the pivotal hanging head section and the connection ring.

22 Claims, 6 Drawing Sheets

CLEVIS STRUCTURE

BACKGROUND OF THE INVENTION

1. Field of the Invention

The present invention relates generally to a clevis structure, and more particularly to a clevis structure, which is easy to assemble and uneasy to detach or break off. The clevis structure includes a main body, a bridge member and a load member assembled with each other.

2. Description of the Related Art

A conventional clevis structure includes a main body with an opening and a movable buckle assembled with the main body. The movable buckle can be operated to open or close the opening.

The conventional clevis structure has a ring body assembled with a lower section of the main body. The ring body can be connected to a hanging cord for loading thereon an article, a tool, and so on. FIGS. 1 and 2 show a typical clevis. A bridge member 2a is pivotally connected with the lower section of the main body 1a of the clevis. The bottom of the bridge member 2a is formed with a pivotal hanging hole 25a. A load member 3a is pivotally disposed in the pivotal hanging hole 25a. A ring body 6a is pivotally connected with the bottom end of the load member 3a. The ring body 6a can be assembled with a hanging cord or wire 5a, which can be connected with an article or a tool (such as a wrench, a screwdriver, etc.) for an operator to operate or use.

With respect to the structural design and assembling process of such conventional clevis structure, the conventional load member 3a is pivotally disposed in the pivotal hanging hole 25a of the bridge member 2a in a loose-fit manner so that the connected cord, article or tool can be easily and mobilely operated. In practice, during the assembling process, especially before the main body 1a is assembled with the bridge member 2a, it often takes place that the load member 3a unexpectedly detaches and drops out of the pivotal hanging hole 25a of the bridge member 2a. This not only causes inconvenience in the assembling process, but also affects the manufacturing rate of the clevis.

The conventional clevis structure has another shortcoming in operation and application. That is, in consideration of the cooperation and operational mobility of the ring body 6a and the cord 5a, the ring body 6a can freely rotate under the bridge member 2a along with the load member 3a. In this case, in practical use, the ring body 6a is apt to move toward the pivotal hanging hole 25a of the bridge member 2a along with the load member 3a. As a result, the edge of the pivotal hanging hole 25a will compress the ring body 6a to apply shear force onto a section of the ring body 6a in adjacency to the load member 3a. This will lead to twisting, deformation or shear-off of the ring body 6a. Therefore, the use lifetime of the clevis will be shortened. This is not what we expect.

To speak representatively, the conventional clevis structure has the aforesaid shortcomings in structural design. In condition of mobile operation of a user, the clevis structure can be redesigned to eliminate these shortcomings. For example, the load member 3a can be movably latched with and relatively pivotally assembled with the bridge member 2a. In this case, the possibility of the detachment of the load member 3a from the bridge member 2a can be as minimized as possible. Therefore, the shortcoming of inconvenience in the assembling process can be eliminated. Also, the structure and the use form of the conventional clevis can be changed to substantially widen the application range of the clevis. For example, in practical use of the conventional clevis, the ring body 6a is easy to twist, deform or shear off. After changing the structure and the use form of the conventional clevis, this shortcoming can be as improved as possible to prolong the use lifetime of the clevis structure.

SUMMARY OF THE INVENTION

It is therefore a primary object of the present invention to provide a clevis structure, which is easy to assemble and uneasy to detach or break off. The clevis structure includes a main body, a bridge member and a load member assembled with each other. The bridge member has a base section and at least one arm section pivotally connected with the main body, whereby the bridge member and the main body can freely swing relative to each other. The load member is formed with a guide slot extending from the base section to the arm section. The arm section is further formed with a through hole in a position where the arm section is pivotally connected with the main body. The through hole has a diameter larger than a width of the guide slot. The load member has two ends, one of which is enlarged to form a pivotal hanging head section, which can pass through the through hole and the other of which is formed as a connection ring for connecting with a hanging cord. A neck section is formed between the pivotal hanging head section and the connection ring. The neck section is slidably positioned in the guide slot with the pivotal hanging head section slidably hung on the guide slot. Therefore, the load member is freely pivotally rotatably connected with the bridge member. In this case, the shortcomings of the conventional clevis that the load member is easy to detach from the bridge member and it is inconvenient to assemble the load member are eliminated. Also, the shortcoming of the conventional clevis that in use, the load member is easy to twist or break off at the cord hanging end is eliminated.

In the above clevis structure, the base section is formed with a pivotal hanging hole. The guide slot is in communication between the through hole and the pivotal hanging hole.

In the above clevis structure, the diameter of the through hole is larger than a diameter of the pivotal hanging hole. The diameter of the pivotal hanging hole is larger than the width of the guide slot. The pivotal hanging head section has a diameter larger than the diameter of the pivotal hanging hole and the width of the guide slot.

In the above clevis structure, an enlarged annular section is disposed on the neck section of the load member in adjacency to the pivotal hanging head section. The annular section is pivotally connected in the pivotal hanging hole. The width of the guide slot is smaller than or equal to a diameter of the annular section.

In the above clevis structure, the connection ring of the load member has an enlarged board-like ring section. The board-like ring section has shoulder sections. A width of the shoulder sections is larger than the width of the guide slot. The board-like ring section is formed with a perforation for pivotally connecting with a hanging cord.

In the above clevis structure, the main body has a sleeve section in a position where the main body is pivotally connected with the bridge member. A retainer is passed through the sleeve section to pivotally connect the main body at the through hole of the bridge member.

In the above clevis structure, the arm section of the bridge member has a length larger than a distance between the sleeve section of the main body and a bottom of the main body or a distance between a center of the through hole of the bridge member and the base section is larger than a distance between a center of the sleeve section of the main body and the bottom of the main body.

In the above clevis structure, the bridge member has two arm sections perpendicularly connected with the base section to form a U-shaped body. The guide slot extends to one of the arm sections.

In the above clevis structure, the bridge member is an L-shaped body having one arm section pivotally connected with the main body.

In the above clevis structure, the main body is a ring body in the form of a hook and has an opening. The main body has a movable buckle. In normal state, the movable buckle blocks the opening. Alternatively, the main body is a board body in the form of a hook and has an opening. The main body has a movable buckle. In normal state, the movable buckle blocks the opening.

The present invention can be best understood through the following description and accompanying drawings, wherein:

DETAILED DESCRIPTION OF THE PREFERRED EMBODIMENTS

Figure 1:
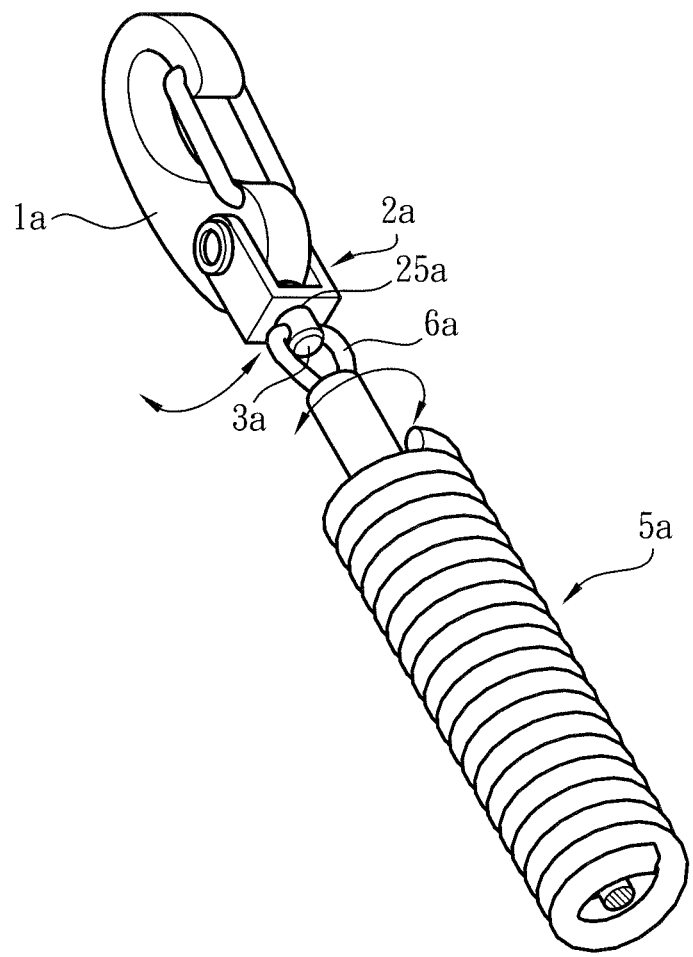
FIG. 1 is a perspective view of a conventional clevis structure.
Figure 2:
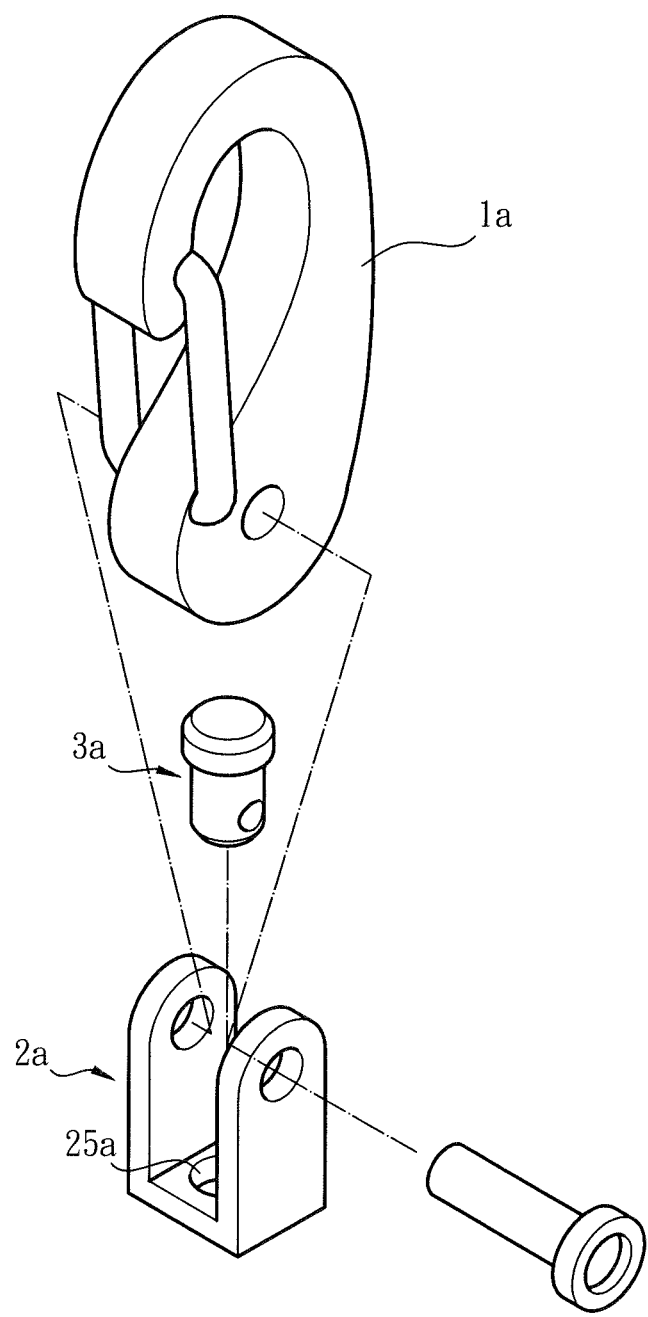
FIG. 2 is a perspective exploded view of the conventional clevis structure according to FIG. 1.
Figure 3:
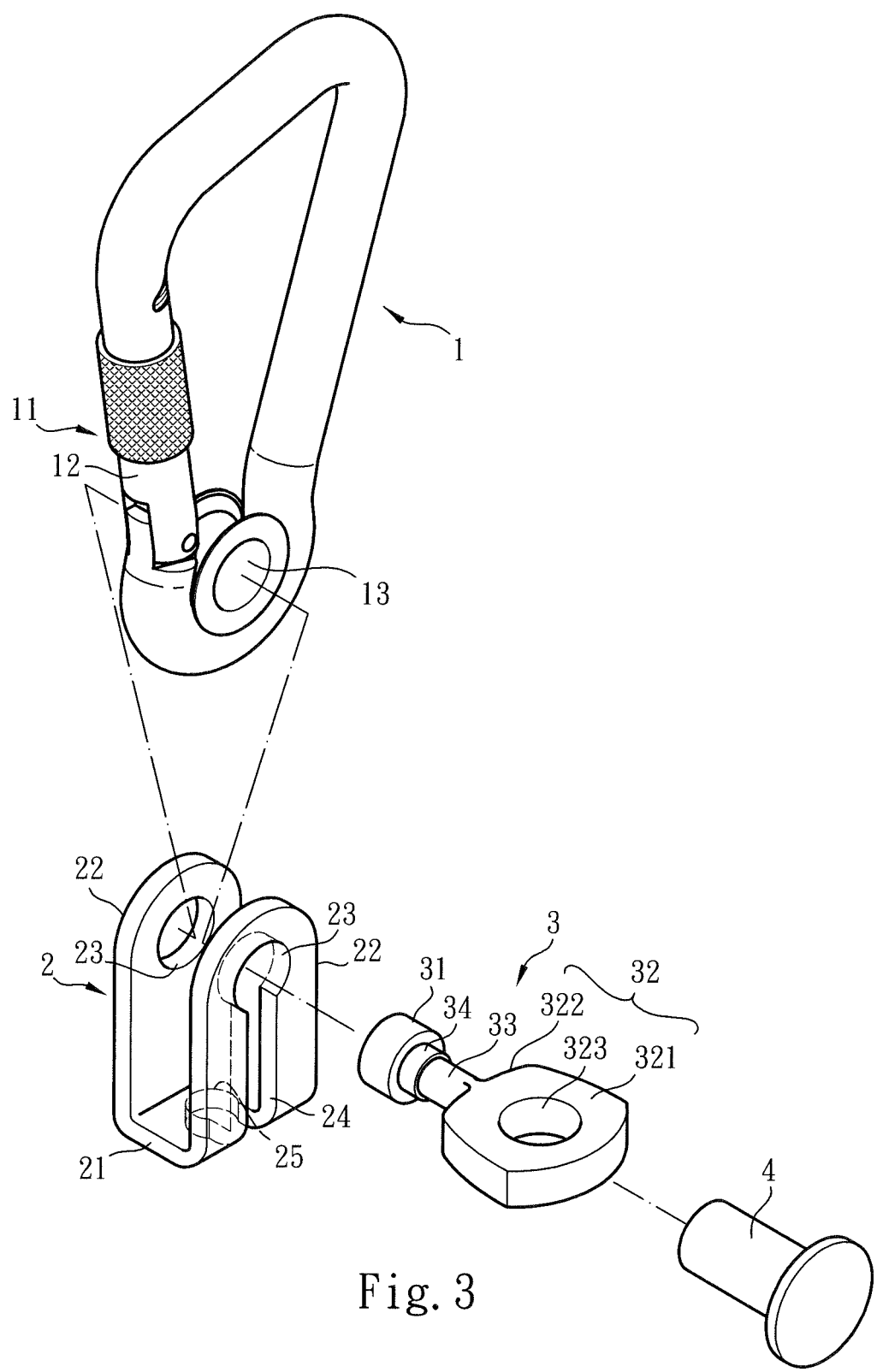
FIG. 3 is a perspective exploded view of the clevis structure of the present invention.
Figure 4:
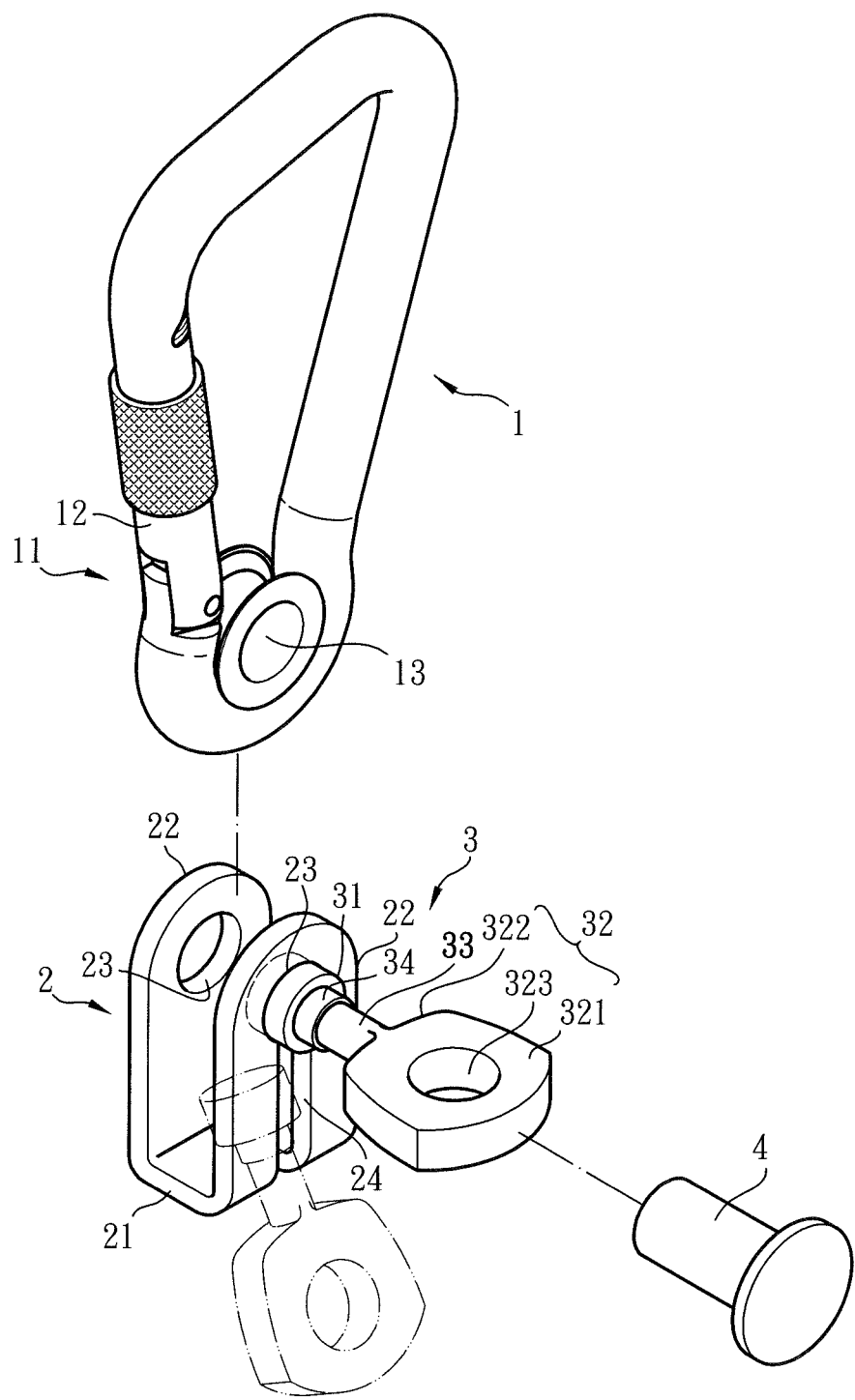
FIG. 4 is a perspective assembled view of the clevis structure of the present invention according to FIG. 3.

Please refer to FIGS. 3 and 4. The clevis structure of the present invention includes a main body 1, a bridge member 2 and a load member 3. The main body 1 is a ring body in the form of a hook and has an opening 11. The main body 1 has a movable buckle 12. In normal state, the movable buckle 12 blocks the opening 11. However, an operator can operate the movable buckle 12 to open the opening 11 and release the main body 1 from a closed state.

The bridge member 2 has a base section 21 and at least one arm section 22. The arm section 22 is formed with a through hole 23 for pivotally connecting with the main body 1. To speak more specifically, the bridge member 2 has two arm sections 22 perpendicularly connected with the base section 21 to form a U-shaped body. The two arm sections 22 are respectively formed with through holes 23.

It should be noted that the bridge member 2 can be alternatively an L-shaped body having one arm section 22 for pivotally connecting with the main body 1.

Figure 5:
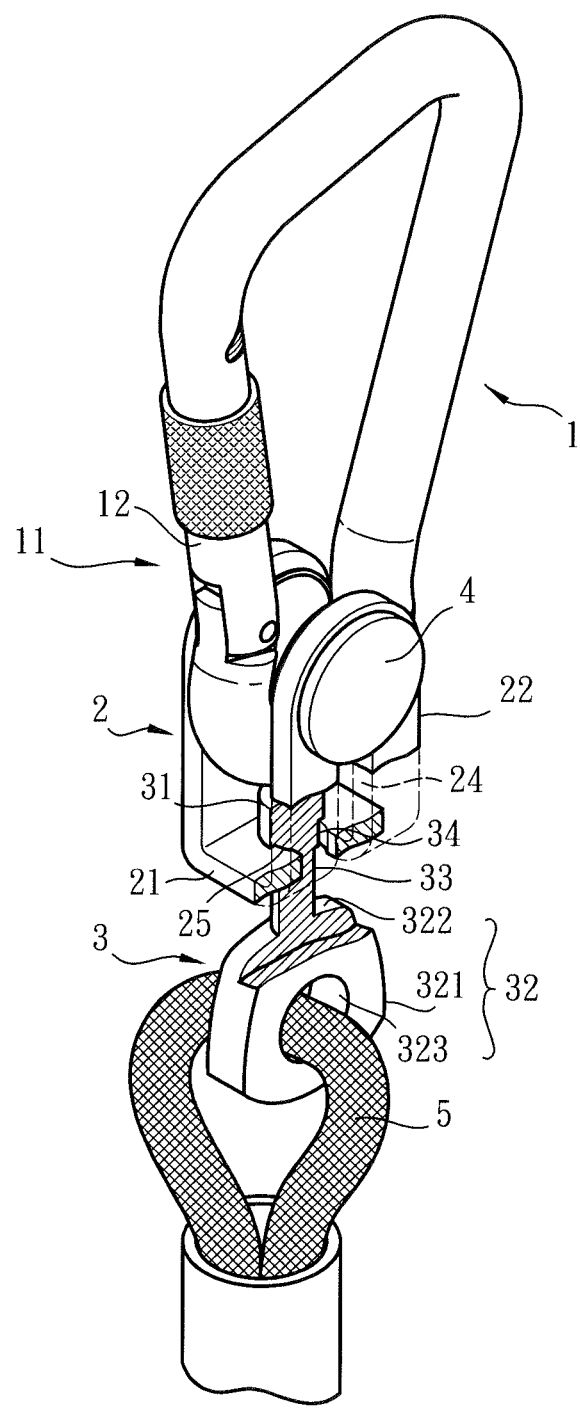
FIG. 5 is a perspective partially sectional view of the clevis structure of the present invention according to FIG. 3, showing the operation of the clevis structure.

The main body 1 has a sleeve section 13. A retainer 4 (such as a rivet or a bolt) can be passed through the through holes 23 of the arm sections 22 of the bridge member 2 and the sleeve section 13 of the main body 1 to pivotally connect the main body 1 with the bridge member 2 as shown in FIG. 5. To speak more specifically, the retainer 4 is passed through the sleeve section 13 of the main body 1 and the through holes 23 of the arm sections 22 to pivotally connect the bridge member 2 onto the main body 1. Moreover, the length of the arm section 22 of the bridge member 2 (or the distance between the center of the through hole 23 and the base section 21) is slightly larger than the distance between the center of the sleeve section 13 of the main body 1 and the bottom of the main body 1. Therefore, the bridge member 2 and the main body 1 can freely swing relative to each other.

In this embodiment, the base section 21 is formed with a guide slot 24 extending to one of the arm sections 22 of the U-shaped bridge member 2. Alternatively, the guide slot 24 can extend to the arm section 22 of the L-shaped bridge member 2 in communication with the through hole 23. The diameter of the through hole 23 is larger than the width of the guide slot 24. In addition, the base section 21 is formed with a pivotal hanging hole 25. The guide slot 24 is in communication between the through hole 23 and the pivotal hanging hole 25. The diameter of the through hole 23 is larger than the diameter of the pivotal hanging hole 25. The diameter of the pivotal hanging hole 25 is larger than the width of the guide slot 24.

Referring to FIGS. 3 to 5, the load member 3 has two ends. One end of the load member 3 is enlarged to form a pivotal hanging head section 31. The other end of the load member 3 is formed as a connection ring 32 for connecting with a hanging cord 5. A neck section 33 is formed between the pivotal hanging head section 31 and the connection ring 32. The diameter of the pivotal hanging head section 31 of the load member 3 is smaller than or equal to (≤) the diameter of the through hole 23, but larger than the diameter of the diameter of the pivotal hanging hole 25 and the width of the guide slot 24. The pivotal hanging head section 31 of the load member 3 can pass through the through hole 23 to make the neck section 33 slidably positioned in the guide slot 24. An enlarged annular section 34 is disposed on the neck section 33 of the load member 3 in adjacency to the pivotal hanging head section 31. The diameter of the annular section 34 is smaller than the diameter of the pivotal hanging head section 31. The width of the guide slot 24 is larger than or equal to (≥) the diameter of the neck section 33, while smaller than or equal to (≤) the diameter of the annular section 34.

The pivotal hanging head section 31 of the load member 3 can pass through the through hole 23 of the bridge member 2 to guide the neck section 33 and the annular section 34 into the through hole 23. The neck section 33 or the annular section 34 can be slidably positioned in the guide slot 24 of the bridge member 2 with the pivotal hanging head section 31 slidably hung on the guide slot 24. Therefore, after the load member 3 is assembled in the guide slot 24 of the bridge member 2, the load member 3 cannot separate from the bridge member 2, but the annular section 34 of the load member 3 can be pivotally connected in the pivotal hanging hole 25 of the bridge member 2. Accordingly, the annular section 34 of the load member 3 can freely rotate within the pivotal hanging hole 25.

In this embodiment, the connection ring 32 of the load member 3 has an enlarged board-like ring section 321. The board-like ring section 321 has two shoulder sections 322 respectively formed on two sides of the load member 3. The width of the shoulder sections 322 is larger than the width of the guide slot 24, whereby the shoulder sections 322 respectively correspond to the surfaces of the bridge member 2 (the base section 21 or the arm section 22) on two sides of the guide slot 24. The shoulder sections 322 extend with the board-like ring section 321 to two sides of the load member 3 to form a wide and flat form. The board-like ring section 321 is formed with a perforation 323 for pivotally connecting with the hanging cord 5 (or a wire, an elastic cord, a steel cord, etc.) The hanging cord 5 can be assembled/connected with an external tool (such as a wrench, a screwdriver, etc.) for an operator to operate or use.

Figure 6:
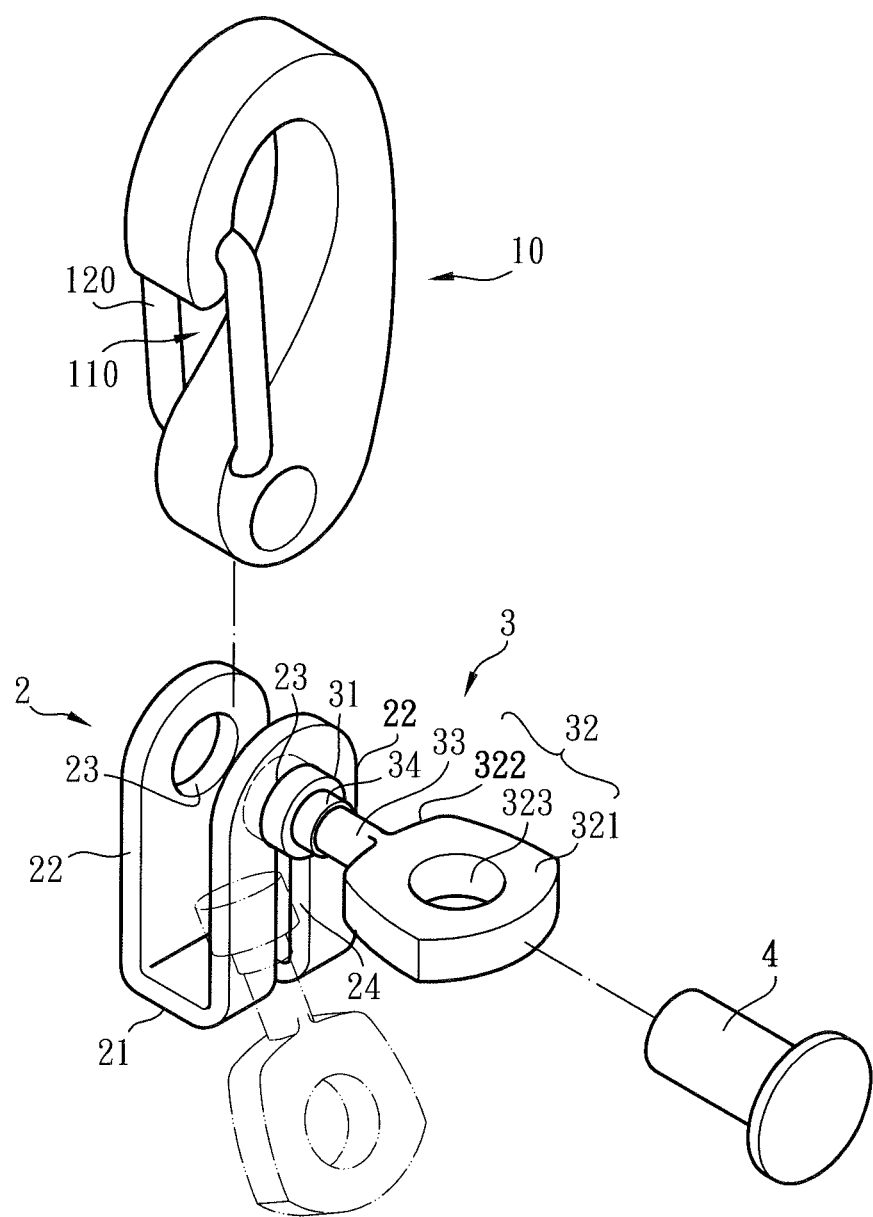
FIG. 6 is a perspective assembled view of another embodiment of the clevis structure of the present invention according to FIG. 4.

Please refer to FIG. 6. In a preferred embodiment, the main body 10 is a board body in the form of a hook. The main body 10 has an opening 110 and a movable buckle 120. In normal state, the movable buckle 120 blocks the opening 110.

According to the above arrangement, in condition of mobile operation, in comparison with the conventional device, the clevis structure of the present invention has the following advantages:

1. The structural form of the assembly of the main body 1, the bridge member 2 and the cooperative load member 3 has been redesigned. For example, the assembly of the main body 1 and the bridge member 2 is obviously different from the conventional device in structure. Moreover, the bridge member 2 is formed with the through hole 23, the guide slot 24 and the pivotal hanging hole 25 for assembling with the load member 3. This is also obviously different from the conventional device. Furthermore, the load member 3 is movably latched with the bridge member 2 and is pivotally rotatable relative to the bridge member 2. This is also obviously different from the conventional device. In addition, before the main body 1 is assembled with the bridge member 2, the load member 3 can be passed through the through hole 23 and slidably latched in the guide slot 24 and pivotally positioned in the pivotal hanging hole 25. Therefore, the load member 3 is not apt to detach from the bridge member 2. This facilitates the assembling process. In contrast, in the assembling process of the conventional device, the load member is easy to detach from the pivotal hanging hole of the bridge member. This causes inconvenience in the assembling process and will affect the manufacturing rate. The present invention apparently improves this shortcoming.

2. The main body 1, the bridge member 2 and the board-like ring section 321 of the load member 3 are assembled in such a manner that in practical use, when the board-like ring section 321 moves toward the pivotal hanging hole 25 of the bridge member 2 along with the load member 3, the edge of the pivotal hanging hole 25 will compress the shoulder sections 322 to apply shear force to the board-like ring section 321. At this time, the wide and flat form of the shoulder sections 322 can resist against the shear force, whereby the structure of the board-like ring section 321 is uneasy to twist or deform or shear off due to the shear force. Accordingly, the use lifetime of the clevis structure can be prolonged. In contrast, in practical use of the conventional clevis, the ring body of the conventional clevis is easy to twist, deform or shear off. The present invention as minimizes the possibility of breakage of the ring body as possible.

In conclusion, the clevis structure of the present invention is effective and different from the conventional clevis in space form. The clevis structure of the present invention is inventive, greatly advanced and advantageous over the conventional clevis.

The above embodiments are only used to illustrate the present invention, not intended to limit the scope thereof. Many modifications of the above embodiments can be made without departing from the spirit of the present invention.

What is claimed is:

1. A clevis structure comprising a main body, a bridge member and a load member assembled with each other, the bridge member having a base section and at least one arm section, the base section is formed with a pivotal hanging hole, the arm section being pivotally connected with the main body, whereby the bridge member and the main body can freely swing relative to each other, the bridge member being formed with a guide slot extending from the base section to the arm section, the arm section being formed with a through hole in a position where the arm section is pivotally connected with the main body, the through hole having a diameter larger than a width of the guide slot, the load member having two ends, one end of the load member being enlarged to form a pivotal hanging head section, which can pass through the through hole, the guide slot being in communication between the through hole and the pivotal hanging hole, the other end of the load member being formed as a connection ring for connecting with a hanging cord, a neck section being formed between the pivotal hanging head section and the connection ring, the neck section being slidably positioned in the guide slot, the pivotal hanging head section being slidably hung on the guide slot, whereby the load member is freely pivotally rotatably connected on the bridge member.

2. The clevis structure as claimed in claim 1, wherein the diameter of the through hole is larger than a diameter of the pivotal hanging hole, the diameter of the pivotal hanging hole being larger than the width of the guide slot, the pivotal hanging head section having a diameter larger than the diameter of the pivotal hanging hole and the width of the guide slot.

3. The clevis structure as claimed in claim 2, wherein an enlarged annular section is disposed on the neck section of the load member in adjacency to the pivotal hanging head section, the annular section being pivotally connected in the pivotal hanging hole, the width of the guide slot being smaller than or equal to a diameter of the annular section.

4. The clevis structure as claimed in claim 2, wherein an enlarged annular section is disposed on the neck section of the load member in adjacency to the pivotal hanging head section, the annular section being pivotally connected in the pivotal hanging hole, the width of the guide slot being smaller than or equal to a diameter of the annular section; the connection ring of the load member has an enlarged board-like ring section, the board-like ring section having shoulder sections, a width of the shoulder sections being larger than the width of the guide slot, the board-like ring section being formed with a perforation for pivotally connecting with a hanging cord.

5. The clevis structure as claimed in claim 1, wherein the main body has a sleeve section in a position where the main body is pivotally connected with the bridge member, a retainer being passed through the sleeve section to pivotally connect the main body at the through hole of the bridge member.

6. The clevis structure as claimed in claim 5, wherein the arm section of the bridge member has a length larger than a distance between the sleeve section of the main body and a bottom of the main body.

7. The clevis structure as claimed in claim 5, wherein a distance between a center of the through hole of the bridge member and the base section is larger than a distance between a center of the sleeve section of the main body and the bottom of the main body.

8. The clevis structure as claimed in claim 1, wherein the bridge member has two arm sections perpendicularly connected with the base section to form a U-shaped body, the guide slot extending to one of the arm sections.

9. The clevis structure as claimed in claim 1, wherein the bridge member has two arm sections perpendicularly connected with the base section to form a U-shaped body, the guide slot extending to one of the arm sections.

10. The clevis structure as claimed in claim 5, wherein the bridge member has two arm sections perpendicularly connected with the base section to form a U-shaped body, the guide slot extending to one of the arm sections.

11. The clevis structure as claimed in claim 1, wherein the bridge member is an L-shaped body having one arm section pivotally connected with the main body.

12. The clevis structure as claimed in claim 5, wherein the main body is a ring body in the form of a hook and has an opening, the main body having a movable buckle, in a normal state, the movable buckle blocking the opening.

13. The clevis structure as claimed in claim 8, wherein the main body is a ring body in the form of a hook and has an opening, the main body having a movable buckle, in a normal state, the movable buckle blocking the opening.

14. The clevis structure as claimed in claim 1, wherein the main body is a board body in the form of a hook and has an opening, the main body having a movable buckle, in a normal state, the movable buckle blocking the opening.

15. The clevis structure as claimed in claim 5, wherein the main body is a board body in the form of a hook and has an opening, the main body having a movable buckle, in a normal state, the movable buckle blocking the opening.

16. The clevis structure as claimed in claim 8, wherein the main body is a board body in the form of a hook and has an opening, the main body having a movable buckle, in a normal state, the movable buckle blocking the opening.

17. A clevis structure comprising a main body, a bridge member and a load member assembled with each other, the bridge member having a base section and at least one arm section, the base section is formed with a pivotal hanging hole, the arm section being pivotally connected with the main body, whereby the bridge member and the main body can freely swing relative to each other, the bridge member being formed with a guide slot extending from the base section to the arm section, the arm section being formed with a through hole in a position where the arm section is pivotally connected with the main body, the through hole having a diameter larger than a width of the guide slot, the load member having two ends, one end of the load member being enlarged to form a pivotal hanging head section, which can pass through the through hole, the guide slot being in communication between the through hole and the pivotal hanging hole, the other end of the load member being formed as a connection ring for connecting with a hanging cord, a neck section being formed between the pivotal hanging head section and the connection ring, the neck section being slidably positioned in the guide slot the pivotal hanging head section being slidably hung on the guide slot, whereby the load member is freely pivotally rotatably connected on the bridge member, the connection ring of the load member having an enlarged board-like ring section, the board-like ring section having shoulder sections, a width of the shoulder sections being larger than the width of the guide slot, the board-like ring section being formed with a perforation for pivotally connecting with a hanging cord.

18. The clevis structure as claimed in claim 17, wherein the main body has a sleeve section in a position where the main body is pivotally connected with the bridge member, a retainer being passed through the sleeve section to pivotally connect the main body at the through hole of the bridge member.

19. The clevis structure as claimed in claim 17, wherein the bridge member is an L-shaped body having one arm section pivotally connected with the main body.

20. The clevis structure as claimed in claim 17, wherein the main body is a ring body in the form of a hook and has an opening, the main body having a movable buckle, in a normal state, the movable buckle blocking the opening.

21. The clevis structure as claimed in claim 17, wherein the main body is a board body in the form of a hook and has an opening, the main body having a movable buckle, in a normal state, the movable buckle blocking the opening.

22. A clevis structure comprising a main body, a bridge member and a load member assembled with each other, the bridge member having a base section and at least one arm section, the arm section being pivotally connected with the main body, whereby the bridge member and the main body can freely swing relative to each other, the bridge member being formed with a guide slot extending from the base section to the arm section, the arm section being formed with a through hole in a position where the arm section is pivotally connected with the main body, the through hole having a diameter larger than a width of the guide slot, the load member having two ends, one end of the load member being enlarged to form a pivotal hanging head section which can pass through the through hole, the other end of the load member being formed as a connection ring for connecting with a hanging cord, a neck section being formed between the pivotal hanging head section and the connection ring, the neck section being slidably positioned in the guide slot, the pivotal hanging head section being slidably hung on the guide slot, whereby the load member is freely pivotally rotatably connected on the bridge member, the main body is a ring body in the form of a hook and having an opening, the main body having a movable buckle, in a normal state, the movable buckle blocking the opening.

* * * * *